(No Model.) 2 Sheets—Sheet 1.

A. EDWARDS & S. J. VAN STAVOREN.
MERCURY SEAL JOINT TRAP FOR BATH TUBS, &c.

No. 270,034. Patented Jan. 2, 1883.

Witnesses:

Inventors
Abraham Edwards
S. J. Van Stavoren
By S. J. Van Stavoren
Attorney (No Model.) 2 Sheets—Sheet 2.
A. EDWARDS & S. J. VAN STAVOREN.
MERCURY SEAL JOINT TRAP FOR BATH TUBS, &c.
No. 270,034. Patented Jan. 2, 1883.
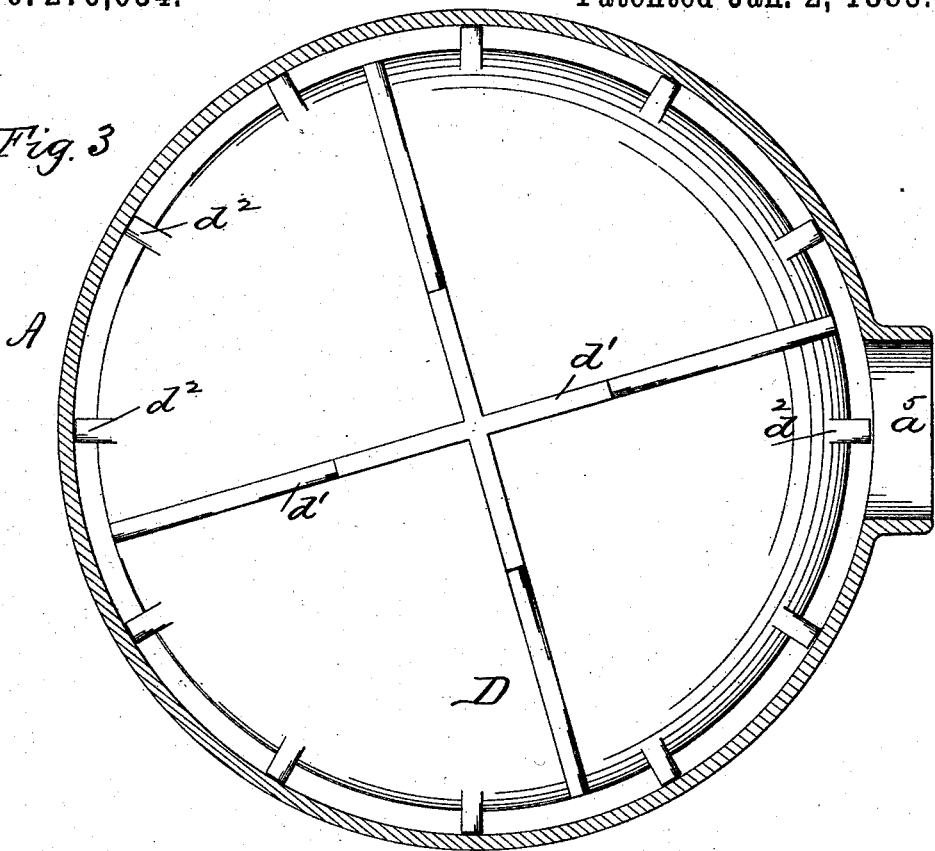
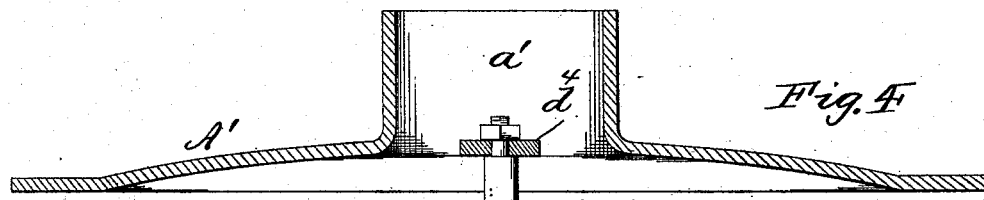
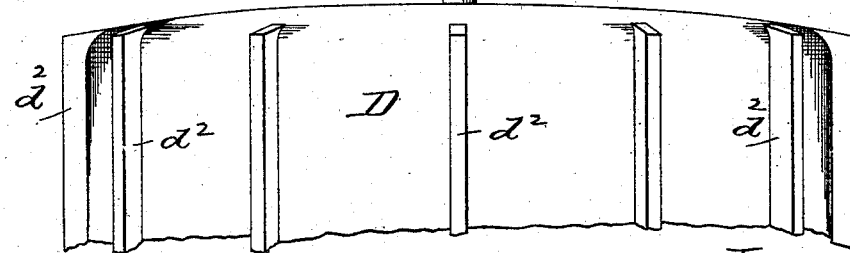
Witnesses:
Edwin Paramore
M. H. Boyanger
Inventors,
Abraham Edwards
S. J. Van Stavoren
By S. J. Van Stavoren
Attorney

UNITED STATES PATENT OFFICE.

ABRAHAM EDWARDS, OF ASBURY PARK, N. J., AND SAMUEL J. VAN STAVOREN, OF PHILADELPHIA, PA., ASSIGNORS TO SAID EDWARDS.

MERCURY-SEAL-JOINT TRAP FOR BATH-TUBS, &c.

SPECIFICATION forming part of Letters Patent No. 270,034, dated January 2, 1883.

Application filed May 22, 1882. (No model.)

*To all whom it may concern:*

Be it known that we, ABRAHAM EDWARDS, of Asbury Park, in the State of New Jersey, and SAMUEL J. VAN STAVOREN, of Philadelphia, in the State of Pennsylvania, citizens of the United States, have invented certain new and useful Improvements in Mercury-Seal-Joint Traps for Bath-Tubs, &c., of which the following is a specification, reference being had therein to the accompanying drawing, wherein—

Figure 1:
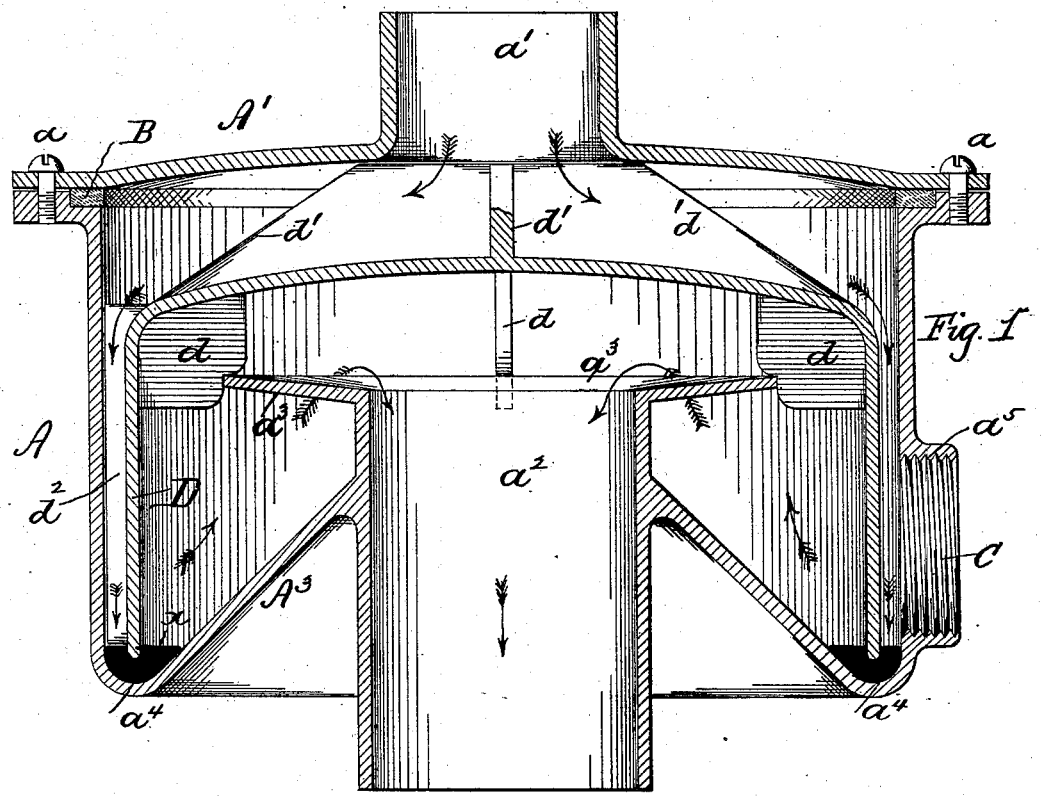
Figure 2:
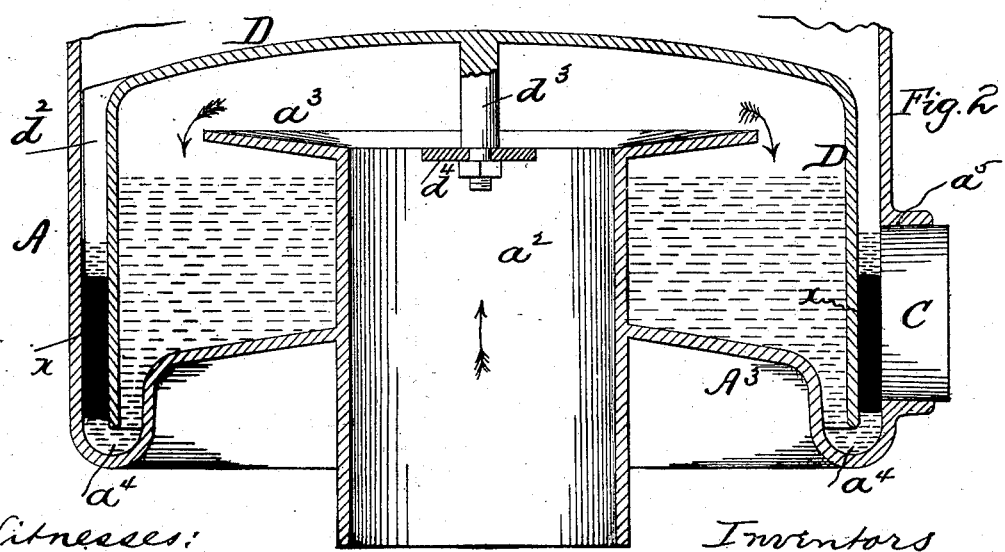

Figure 1 is a transverse vertical section of a mercury-seal-joint trap embodying our invention. Fig. 2 is a similar view of a modification of same, showing the position of the mercury-seal when subjected to back-pressure from the main. Fig. 3 is a horizontal section through the body of the trap, the inverted cup, with scrapers or conveyers being in plan. Fig. 4 is a detail broken elevation, partly sectional, showing a further modification of our invention.

Our invention has for its object to provide an improved mercury-seal-joint trap for bath-tubs, &c., of simple construction, the parts of which are readily put together and the trap effectually cleansed without disconnecting its parts.

Our invention consists in the novel construction and arrangement of the trap and its parts, as hereinafter specifically described and claimed.

Referring to the accompanying drawings, A represents the body of the trap, which is of cylindrical or other suitable form in outline, provided with a top or cover, A'. Said parts are flanged, and bolted together, as shown at $a$, or they may be secured to one another in any other desired manner. B represents a packing, of rubber, cement, or other material, between said body and top to form an air-tight joint. The top A' has a central induction-pipe, $a'$, and the body A has a similarly-located eduction-pipe, $a^2$, with flange $a^3$, a trough, $a^4$, for holding the mercury or other sealing medium, and a lateral opening, $a^5$, provided with a screw stopple or plug, $c$, as shown.

D represents an inverted cylindrical cup, having internal radial lugs, $d$, by means of which said cup is supported on flange $a^3$ of pipe $a^2$, so as to be rotated thereon. $d'$ $d'$ represent other lugs formed on the upper side of the top of said cup to prevent it being lifted off of flange $a^3$ by back-pressure from the soil-pipe. $d^2$ $d^2$ are vertical ribs on the outside of said cup, and extend laterally to almost touch the interior wall of the body A, so that when the cup D is rotated by insertion of a wire or other suitable means in opening $a^5$ the ribs $d^2$ serve as scrapers for removing dirt or grease adhering to the wall of body A, and as conveyers for bringing such dirt to the opening $a^5$, from whence it may readily be removed from the trap.

The operation of the trap is as follows: Water from the bath-tub, &c., enters induction-pipe $a'$, flows into body A, passes down outside of cup D, forces mercury $x$ up inclined or curved bottom $A^3$, thereby breaking the seal, whereupon such water passes under the edge of cup D, and thence to the eduction-pipe $a^2$. The flange $a^3$ prevents the mercury from passing out with such water, if the pressure of the latter be such that the mercury is caused to flow up to the top of the inclined bottom $A^3$. When the flow of water ceases the mercury returns to the trough $a^4$ and seals the edge of cup D.

Should there be any back-pressure of gas from the sewer, the mercury passes into the space between the body A and cup D. Such space, being of proportionately smaller area than that of the trough $a^3$, causes the mercury to increase in depth as it rises therein to prevent a deeper seal for preventing such gas passing through the trap, as plainly shown in Fig. 2.

If desired, the lugs $d$ $d'$ may be dispensed with and the cup D be formed with a stud, $d^3$, which may be journaled to a cross-bar, $d^4$, cast on pipe $a^2$ or on induction-pipe $a'$, as illustrated in Figs. 2 and 4. So, too, while we have shown and described the cup D so arranged that its cylindrical part is but a slight distance from the wall of body A, we do not wish to be confined to such arrangement and location, as it is evident that the distance between said parts may be increased to any desired or suitable extent. In all cases, however, the ribs $d^2$ $d^2$ are of such lateral extent that they nearly impinge against the wall of the trap-body. Again, we have shown the eduction and induction pipes aligning with each other, and the latter having a smaller diameter or less area than that of the former. Such construction prevents siphoning of the contents of the trap; but we do not restrict ourselves to that precise construction, as the said pipes may be arranged out of line with one another and have the same diameter or area.

What we claim as our invention is—

1. A stench-trap composed of a body having lateral cleaning-out opening and an eduction-pipe, a top or cover for said body, having an induction-pipe, and an inverted cup suspended within said body between the induction and eduction pipes, and provided with external vertical ribs or scrapers, substantially as shown and described.

2. A stench-trap composed of a body, a top or cover therefor, a cleaning-out opening, eduction and induction pipes, and an inverted cup suspended between said pipes and adapted to be rotated to effect a cleansing of the trap, substantially as shown and described.

3. The combination of body A, top A', and inverted cup D, the body A having lateral or cleaning-out opening $a^5$, provided with removable stopple C, mercury-holding groove or trough $a^4$, eduction-pipe $a^2$, flanged at $a^3$, and the top A', having induction-pipe $a'$, substantially as shown and described.

4. The combination of body A, having lateral opening $a^5$, provided with stopple C, mercury-holding trough or groove $a^4$, and eduction-pipe $a^2$, the top or cover A', having induction-pipe $a'$, and the inverted cup D, suspended between said induction and eduction pipes, and provided with vertical ribs $d^2$, substantially as shown and described.

5. A stench-trap composed of a top with induction-pipe, a body having eduction-pipe, and a trough or groove with a mercury-seal, and an inverted cup between said pipes, the lower edge of the cup dipping into said sealing medium, and said cup being of such size or diameter that the horizontal area or width of the space between the cup and the body of the trap is less than the width or extent of the mercury or sealing medium in said groove or trough, substantially as shown and described.

6. In a stench-trap, the combination, with a body having an eduction-pipe, and a top therefor, having an induction-pipe, of an inverted cup between said eduction and induction pipes, adapted to be rotated on its bearings to cleanse the wall or sides of the trap, substantially as shown and described.

7. The stench-trap herein shown and described, provided with cup D, having external vertical ribs, $d^2$, substantially as set forth.

In testimony whereof we affix our signatures in presence of two witnesses.

ABRAHAM EDWARDS.
SAMUEL J. VAN STAVOREN.

Witnesses:
EDWIN PARAMORE,
CHAS. F. VAN HORN.